US012723387B2

(12) United States Patent
Yang

(10) Patent No.: US 12,723,387 B2
(45) Date of Patent: Sep. 1, 2026

(54) WATER VALVE FIXATION SYSTEM

(71) Applicant: Tsai-Chen Yang, Taichung City (TW)

(72) Inventor: Tsai-Chen Yang, Taichung City (TW)

( * ) Notice: Subject to any disclaimer, the term of this patent is extended or adjusted under 35 U.S.C. 154(b) by 78 days.

(21) Appl. No.: 18/674,065

(22) Filed: May 24, 2024

(65) Prior Publication Data

US 2025/0361704 A1 Nov. 27, 2025

(51) Int. Cl.
*E03C 1/042* (2006.01)
*F16M 13/02* (2006.01)

(52) U.S. Cl.
CPC ............. *E03C 1/042* (2013.01); *F16M 13/02* (2013.01)

(58) Field of Classification Search
CPC .......... E03C 1/042; E03C 1/021; F16M 13/02
See application file for complete search history.

(56) References Cited

U.S. PATENT DOCUMENTS 7,055,863 B1 * 6/2006 Commeville ............. F16L 5/02 52/220.8
9,091,377 B2 * 7/2015 Lechuga ............... F16L 13/141
9,651,174 B2 * 5/2017 Lechuga ................. F16L 21/03
11,118,331 B2 * 9/2021 Li ........................... E03C 1/021
11,377,829 B2 * 7/2022 Li ......................... E03C 1/0403
12,492,536 B1 * 12/2025 Yang ....................... E03C 1/042
2009/0126103 A1 * 5/2009 Dietrich .................. E03C 1/021 4/695
2015/0219245 A1 * 8/2015 Bors ......................... F16L 3/16 248/70
2020/0354931 A1 * 11/2020 Li ............................. E03C 1/04
2025/0155076 A1 * 5/2025 Lin ...................... F16M 11/041

FOREIGN PATENT DOCUMENTS

DE 102007007408 A1 * 8/2008 ............. E03C 1/042
EP 2063030 A2 * 5/2009 ............. E03C 1/021
KR 571480 B1 * 4/2006
WO WO-2006057512 A1 * 6/2006 .............. E03B 9/00

* cited by examiner

*Primary Examiner* — Eret C Mcnichols
(74) *Attorney, Agent, or Firm* — MUNCY, GEISSLER, OLDS & LOWE, P.C.

(57) ABSTRACT

A water valve fixation system is provided, wherein the water valve fixation system includes: a valve member; a fixation base including an upper portion, two connection portions and two wings, the two connection portions being in interval and extending transversely from the upper portion, the two wings extending transversely from the two connection portions, respectively, the two wings being configured to be positioned to a support surface; and at least two support assemblies inserted in and connected to the valve member and the upper portion, and including a spacer interposed between the valve member and the upper portion.

7 Claims, 8 Drawing Sheets

WATER VALVE FIXATION SYSTEM

BACKGROUND OF THE INVENTION

Field of the Invention

The present invention relates to a water valve fixation system.

Description of the Prior Art

Conventionally, the builder usually fixes a water valve to the wall with a metal pad. However, every builder usually uses the metal pad that he is accustomed to using. As such, the fixation structures of the water valves and the stability of the water valve after construction are different from one another, resulting in the poor construction quality.

The present invention is, therefore, arisen to obviate or at least mitigate the above-mentioned disadvantages.

SUMMARY OF THE INVENTION

The main object of the present invention is to provide a water valve fixation system which can effectively and stably secure and support a valve member, and which can effectively reduce the construction and installation time, and ensure the good quality of each construction.

To achieve the above and other objects, a water valve fixation system is provided, wherein the water valve fixation system includes: a valve member; a fixation base including an upper portion, two connection portions and two wings, the two connection portions being in interval and extending transversely from the upper portion, the two wings extending transversely from the two connection portions, respectively, the two wings being configured to be positioned to a support surface; and at least two support assemblies inserted in and connected to the valve member and the upper portion, and including a spacer interposed between the valve member and the upper portion.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
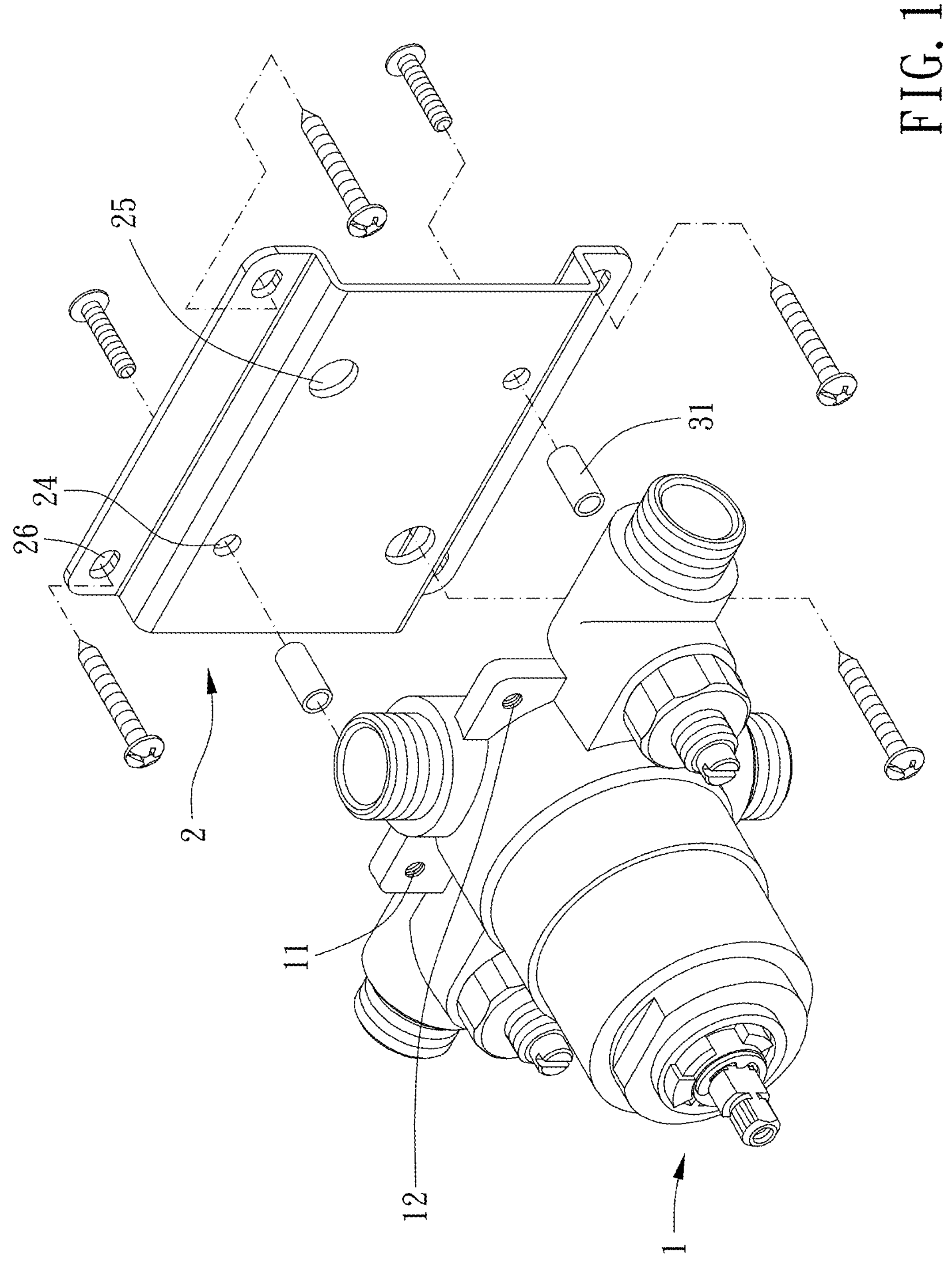
FIG. 1 is a partial breakdown perspective view of a first exemplary embodiment of the present invention.
Figure 2:
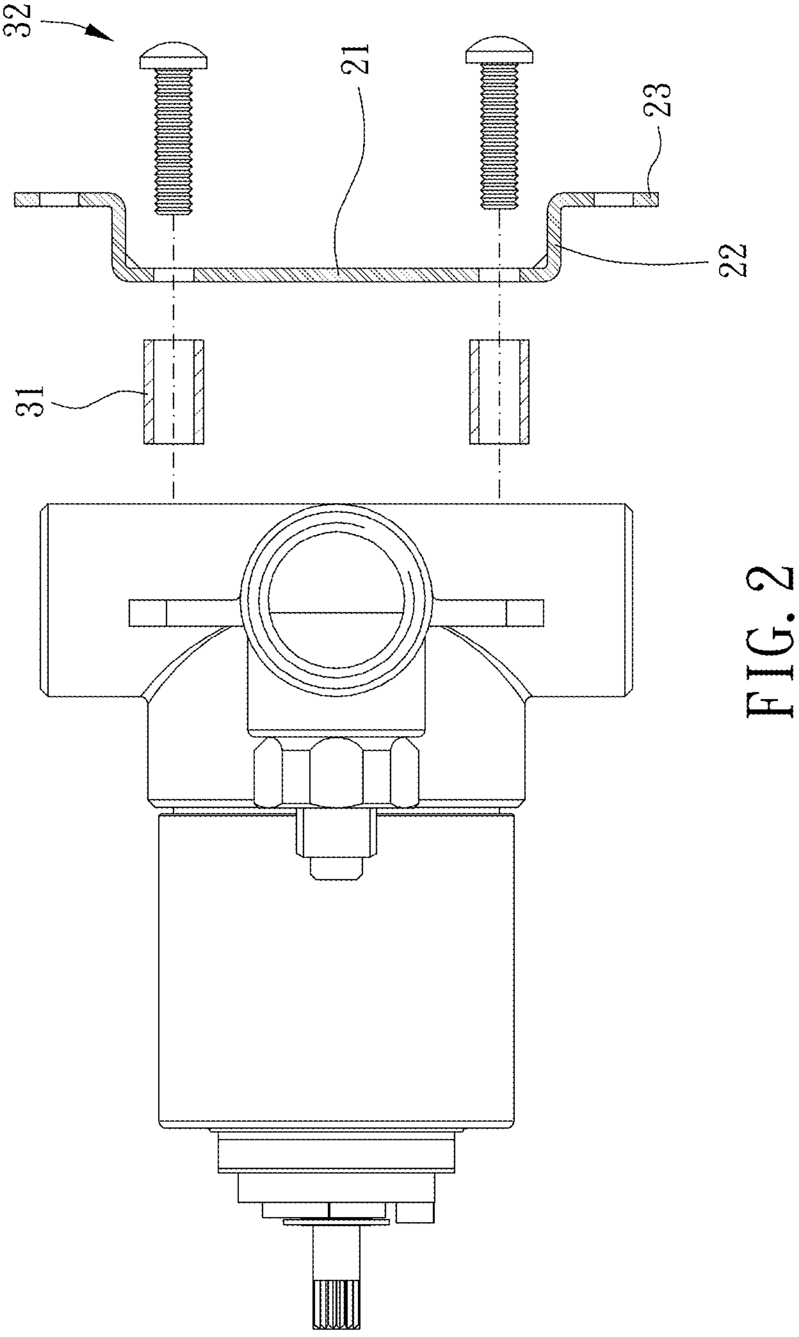
FIG. 2 is a partial cross-sectional view of the first exemplary embodiment of the present invention.
Figure 3:
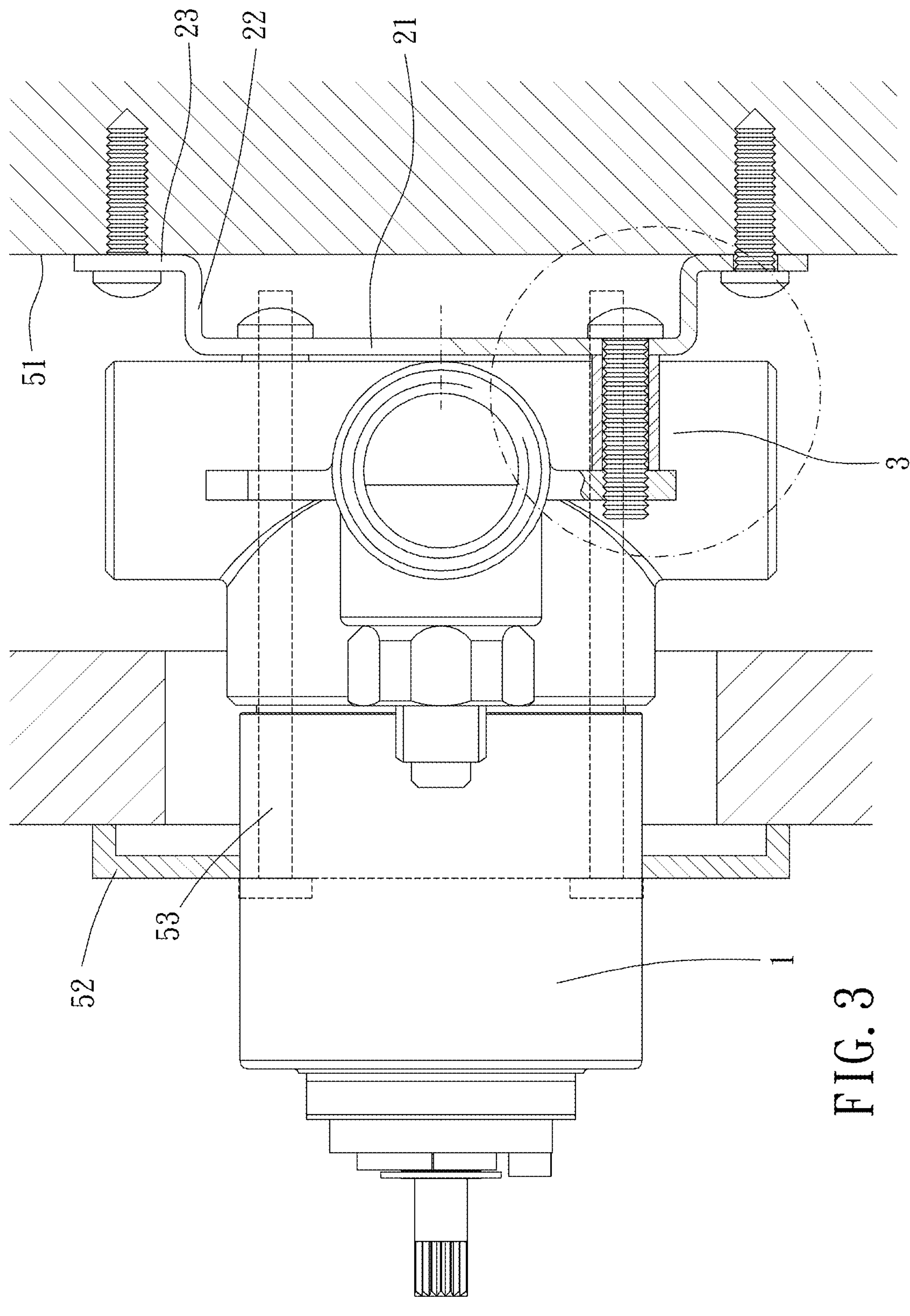
FIG. 3 is a drawing showing an application of the first exemplary embodiment of the present invention.
Figure 4:
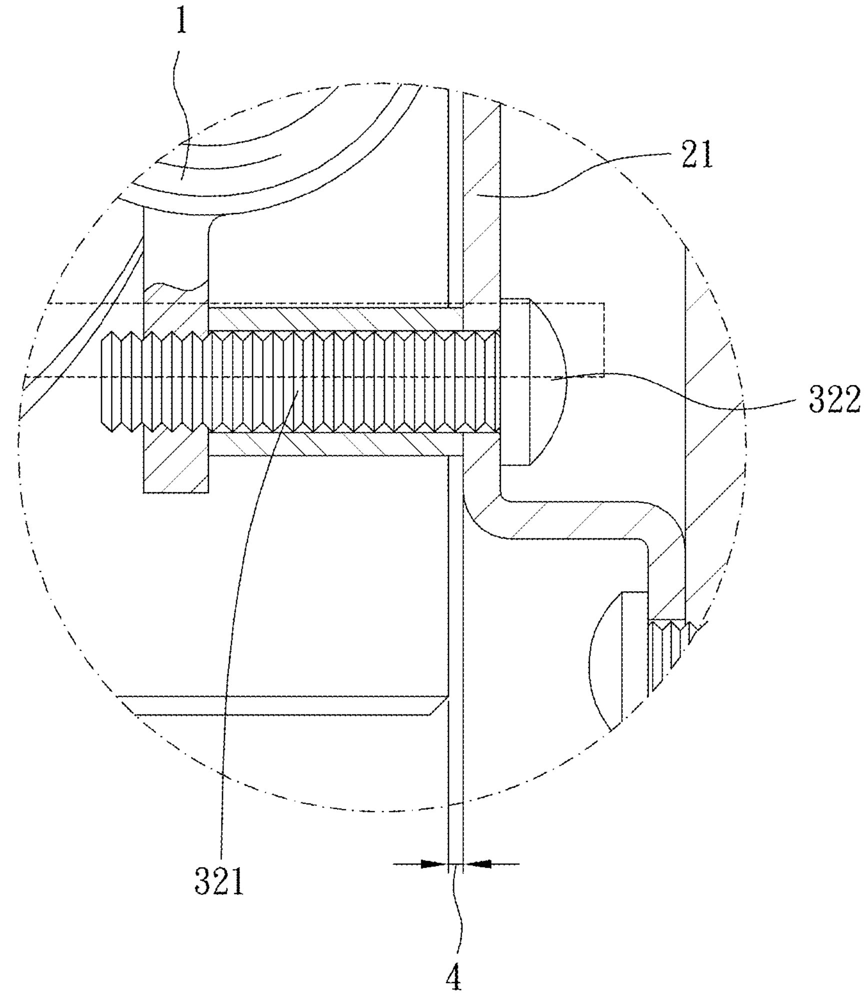
FIG. 4 is a partial enlargement of FIG. 3.

Please refer to FIGS. 1 to 4 for a first exemplary embodiment of the present invention. A water valve fixation system of the present invention includes a valve member 1, a fixation base 2 and at least two support assemblies 3.

The fixation base 2 includes an upper portion 21, two connection portions 22 and two wings 23, the two connection portions 22 are in interval and extend transversely from the upper portion 21, the two wings 23 extend transversely from the two connection portions 22, respectively, and the two wings 23 are configured to be positioned to a support surface 51 so that the fixation base 2 can be served as a foundation to support the valve member 1. The at least two support assemblies 3 are inserted in and connected to the valve member 1 and the upper portion 21, and the at least two support assemblies 3 includes a spacer 31 interposed between the valve member 1 and the upper portion 21, which can effectively and stably secure and support the valve member 1.

In this embodiment, the fixation base 2 is U-shaped, and the upper portion 21 is free of contact with the support surface 51, so that it can lower the heat conduction area to prevent the support surface 51 from being repeatedly heated and deteriorated for a long time. The upper portion 21, two connection portions 22 and two wings 23 are made of a metal plate by bending, which has good structural strength. Preferably, the upper portion 21 has an area larger than a sum of areas of the two wings 23 so that the upper portion 21 can have a wider area blocked between the valve member 1 and the support surface 51, and the upper portion 21 can have more space for the at least two support assemblies 3 to pass through to connect and support the valve member 1.

Preferably, there is a gap 4 between the valve member 1 and the upper portion 21. When hot water passes through the valve member 1, the heat cannot be conducted through the upper portion 21, which can reduce the heat transferred to the support surface 51, thereby maintaining the structural integrity of the support surface 51 and not being directly heated for a long time so as to prevent deterioration.

The valve member 1 further includes at least two first threaded holes 11, the upper portion 21 includes at least two first through holes 24, each of the at least two support assemblies 3 further includes a threaded fastener 32, the spacer 31 is tubular, the threaded fastener 32 includes a threaded body section 321 and a head portion 322 connected to each other, the threaded body section 321 is disposed through the spacer 31 and screwed to the first threaded hole 11, and the head portion 322 is abutted against a side of the upper portion 21 opposite to the spacer 31.

Figure 5:
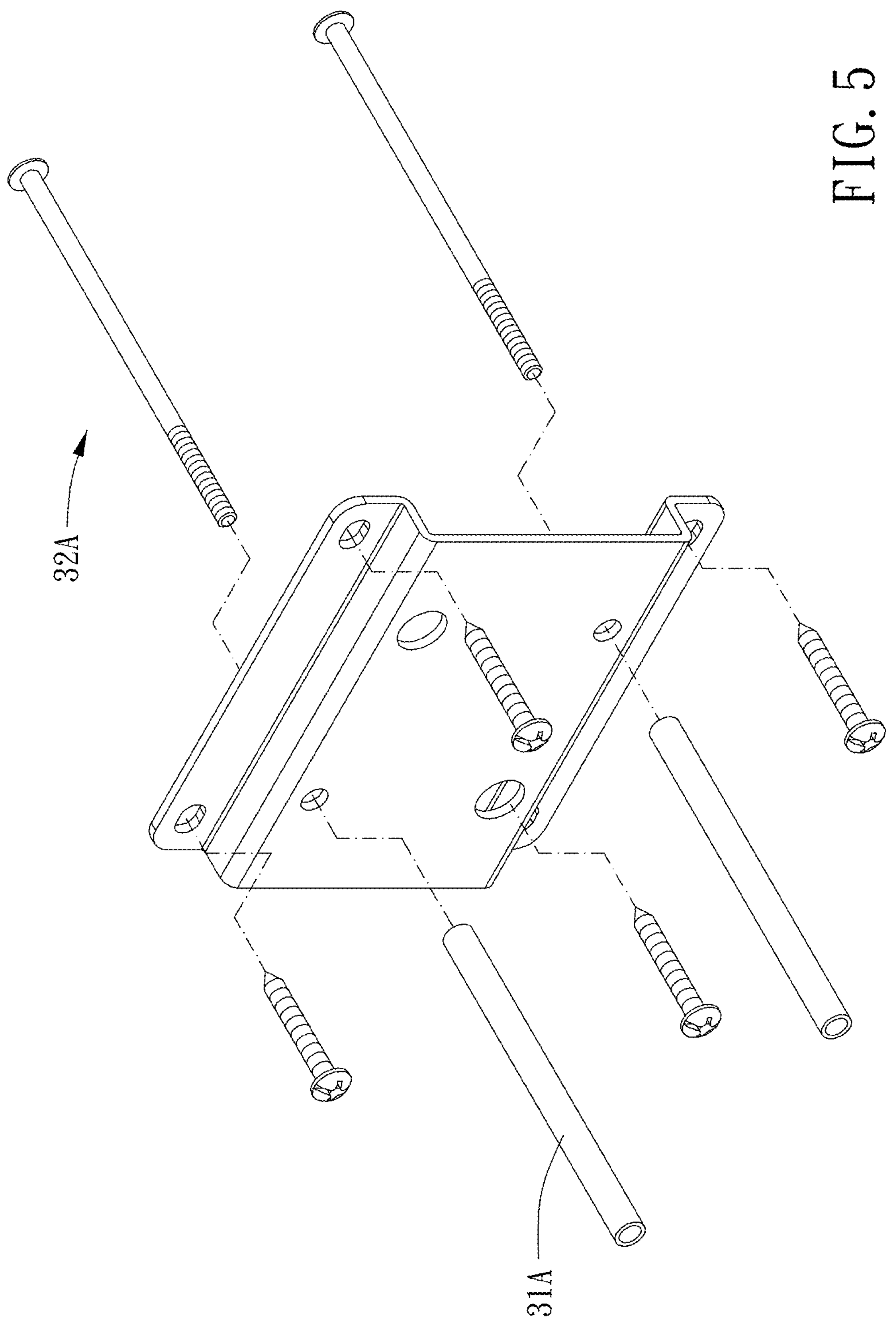
FIG. 5 is a breakdown drawing of a support assembly according to a second exemplary embodiment of the present invention.
Figure 6:
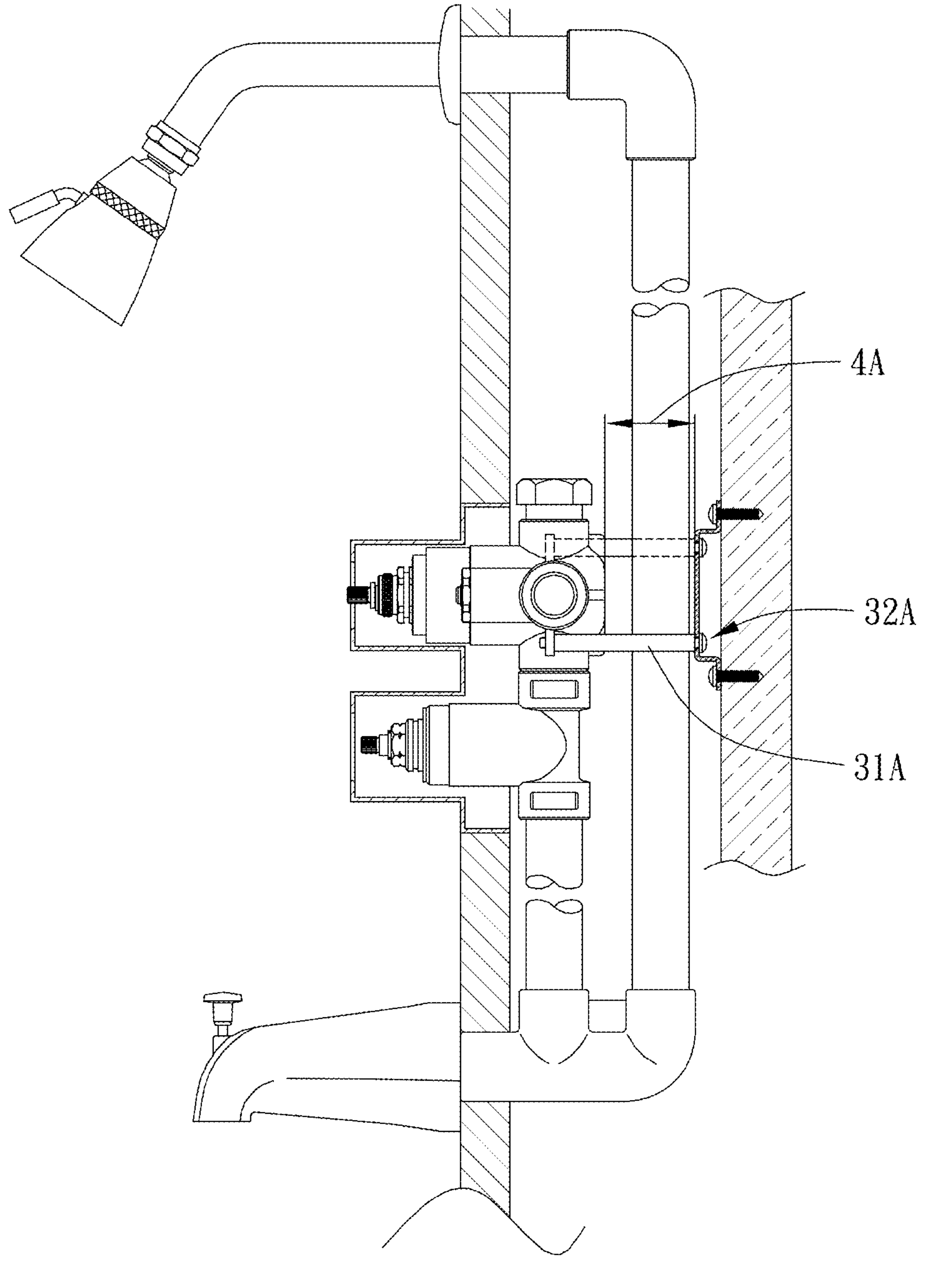
FIG. 6 is a drawing showing an application of the second exemplary embodiment of the present invention.

Different lengths of the spacer 31 can be selected according to different assembly pipeline requirements. For example, in a second embodiment shown in FIGS. 5 and 6, the length of the spacer 31A and the length of the threaded fastener 32A are larger than the length of the spacer 31 and the length of the threaded fastener 32 of the first embodiment, respectively. As such, the gap 4A can allow other pipes, such as shower pipes, to pass therethrough, and the spacer 31A and the threaded fastener 32A can support the pipes from the lateral side direction.

Please refer to FIGS. 1-4 again, the valve member 1 further includes at least two second threaded holes 12, the upper portion 21 includes at least two second through holes 25, the at least two second threaded holes 12 are configured to be connected with at least two positioning screws 53 which are disposed through a cover 52, and the at least two second through holes 25 are configured to be connected with the at least two positioning screws 53. The threaded fastener 32 and the positioning screw 53 are locked to the valve member 1 in opposite directions, which can effectively secure overall structure.

In this embodiment, the number of the at least two first through holes 24 is two, the number of the at least two second through holes 25 is two, the at least two first through holes 24 are diagonally arranged, and the at least two second through holes 25 are diagonally arranged. Each of the at least two second through holes 25 has a diametric dimension larger than a diametric dimension of each of the at least two first through holes 24, which provides a large area margin for installation of the positioning screw 53. Each of the two wings 23 includes at least one third through hole 26, and the at least one third through hole 26 is oval so that the two wings 23 can be secured to the support surface 51 by fasteners.

Figure 7:
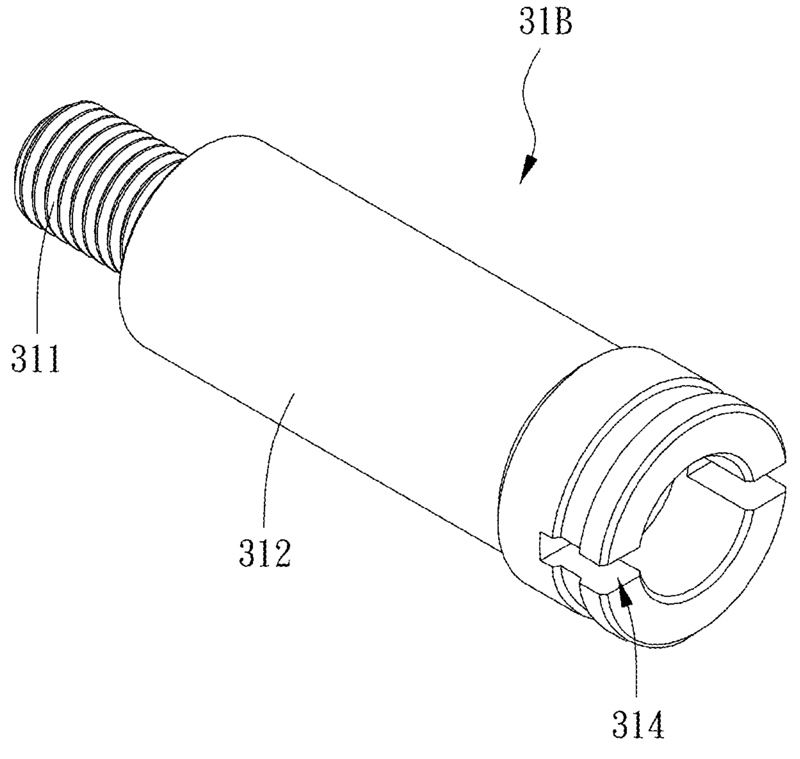
FIG. 7 is a perspective view of a spacer of a third exemplary embodiment of the present invention.
Figure 8:
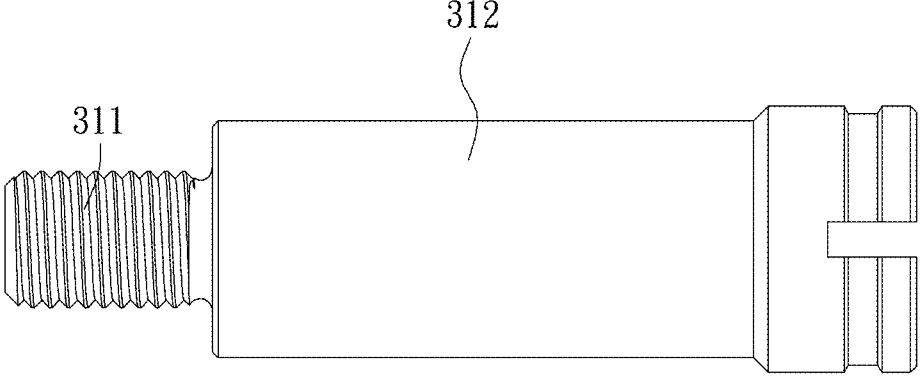
FIG. 8 is a side view of FIG. 7.
Figure 9:
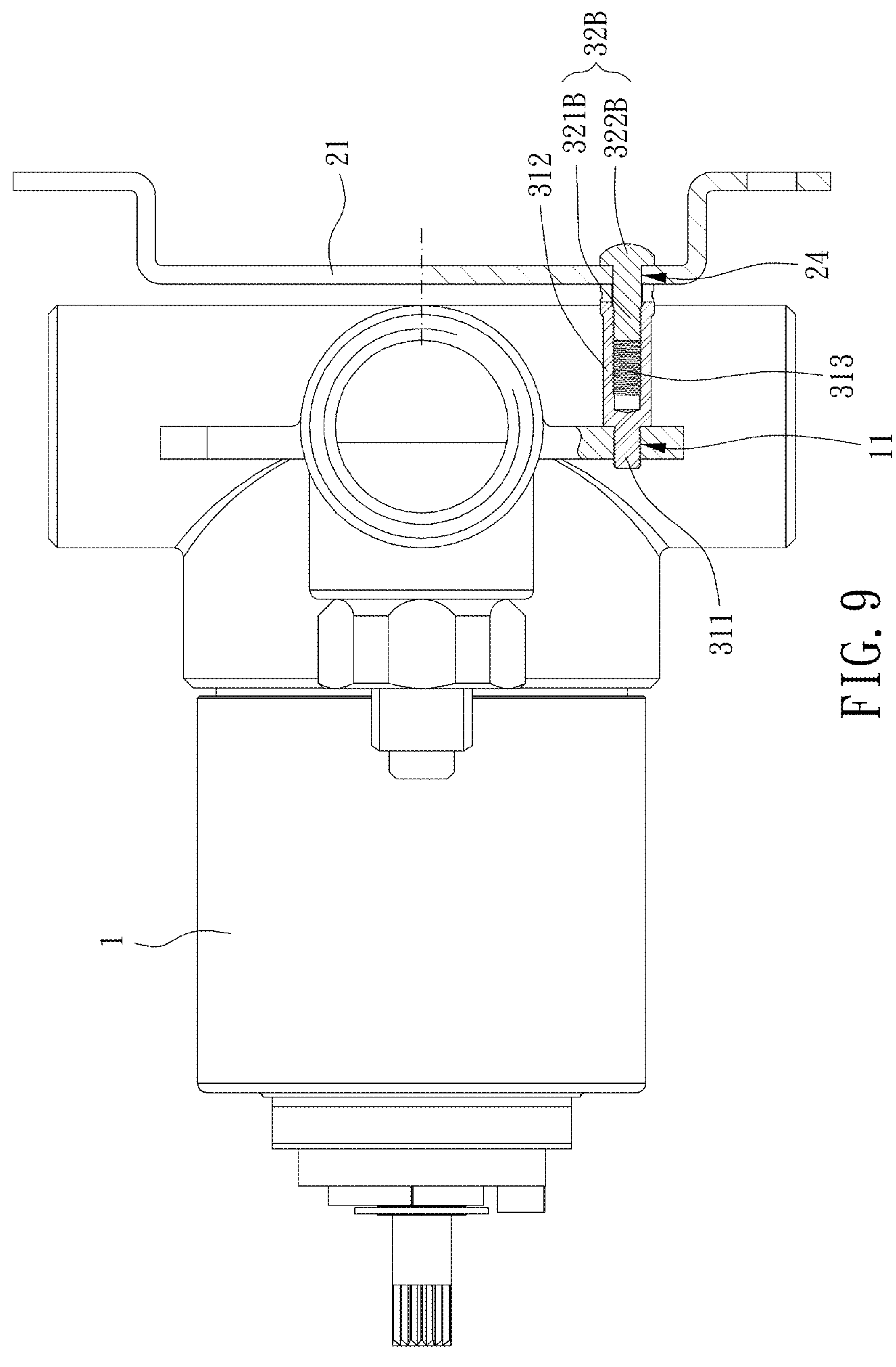
FIG. 9 is a drawing showing an application of the third exemplary embodiment of the present invention.

In a third embodiment shown in FIGS. 7 to 9, the valve member 1 includes the at least two first threaded holes 11, the upper portion 21 includes at least two first through holes 24, each of the at least two support assemblies 3 further includes a threaded fastener 32B, the spacer 31B includes a threaded head 311 and a tubular body 312 connected to each other, the threaded head 311 is screwed to the first threaded hole 11, the tubular body 312 includes an inner threaded section 313, the threaded fastener 32B includes a threaded body section 321B and a head portion 322B connected to each other, the threaded body section 321B is disposed through the first through hole 24 and screwed to the inner threaded section 313, and the head portion 322B is abutted against a side of the upper portion 21 opposite to the spacer 31B.

During the assembly process, the spacer 31B can be positioned to the valve member 1 through the threaded head 311, and the upper portion 21 is then clamped between the tubular body 312 and the head portion 322 through the threaded fastener 32B. This type of connection is easy to assemble, and there is no need to worry about parts falling during the assembly process.

Preferably, an end of the tubular body 312 remote from the threaded head 311 includes a drive portion 314, and the drive portion 314 is configured to be assembled with a tool to drive the spacer 31B to rotate. For example, the drive portion 314 is a linear groove recessed in an axial direction of the tubular body 312, thereby allowing a slotted screwdriver to be inserted thereinto.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A water valve fixation system including:

a valve member;

a fixation base including an upper portion, two connection portions and two wings, the two connection portions being in interval and extending transversely from the upper portion, the two wings extending transversely from the two connection portions, respectively, the two wings being configured to be positioned to a support surface; and at least two support assemblies inserted in and connected to the valve member and the upper portion, and including a spacer interposed between the valve member and the upper portion;

wherein the valve member further includes at least two first threaded holes, the upper portion includes at least two first through holes, each of the at least two support assemblies further includes a threaded fastener, the spacer is tubular, the threaded fastener includes a threaded body section and a head portion connected to each other, the threaded body section is disposed through the spacer and screwed to the first threaded hole, and the head portion is abutted against a side of the upper portion opposite to the spacer.

2. The water valve fixation system of claim 1, wherein there is a gap between the valve member and the upper portion.

3. The water valve fixation system of claim 1, wherein the valve member further includes at least two second threaded holes, the upper portion includes at least two second through holes, the at least two second threaded holes are configured to be connected with at least two positioning screws which are disposed through a cover, and the at least two second through holes are configured to be connected with the at least two positioning screws.

4. The water valve fixation system of claim 3, wherein each of the at least two second through holes has a diametric dimension larger than a diametric dimension of each of the at least two first through holes.

5. The water valve fixation system of claim 4, wherein there is a gap between the valve member and the upper portion; the number of the at least two first through holes is two, the number of the at least two second through holes is two, the at least two first through holes are diagonally arranged, and the at least two second through holes are diagonally arranged; each of the two wings includes at least one third through hole, and the at least one third through hole is oval; the fixation base is U-shaped; the upper portion, the two connection portions and the two wings are made of a metal plate by bending; the upper portion has an area larger than a sum of areas of the two wings.

6. The water valve fixation system of claim 3, wherein the number of the at least two first through holes is two, the number of the at least two second through holes is two, the at least two first through holes are diagonally arranged, and the at least two second through holes are diagonally arranged.

7. A water valve fixation system, including:

a valve member;

a fixation base including an upper portion, two connection portions and two wings, the two connection portions being in interval and extending transversely from the upper portion, the two wings extending transversely from the two connection portions, respectively, the two wings being configured to be positioned to a support surface; and at least two support assemblies inserted in and connected to the valve member and the upper portion, and including a spacer interposed between the valve member and the upper portion;

wherein each of the two wings includes at least one third through hole, and the at least one third through hole is oval.

* * * * *